US008303466B2

(12) United States Patent
Kuriyagawa et al.

(10) Patent No.: US 8,303,466 B2
(45) Date of Patent: Nov. 6, 2012

(54) OUTBOARD MOTOR CONTROL APPARATUS

(75) Inventors: Koji Kuriyagawa, Saitama (JP); Hajime Yoshimura, Saitama (JP); Hikaru Ikeda, Saitama (JP); Yoshiyuki Matsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 565 days.

(21) Appl. No.: 12/580,595

(22) Filed: Oct. 16, 2009

(65) Prior Publication Data

US 2010/0099538 A1    Apr. 22, 2010

(30) Foreign Application Priority Data

Oct. 20, 2008  (JP) ................................. 2008-270211
Oct. 20, 2008  (JP) ................................. 2008-270212
Oct. 20, 2008  (JP) ................................. 2008-270215

(51) Int. Cl.
*F16H 61/58* (2006.01)

(52) U.S. Cl. ........................................................ 477/62

(58) Field of Classification Search .................... 477/57, 477/169, 174; 192/3.31
See application file for complete search history.

(56) References Cited

U.S. PATENT DOCUMENTS

| 4,558,769 A | 12/1985 | Neisen |
| 4,887,984 A | 12/1989 | Newman |
| 5,095,776 A | 3/1992 | Sato |
| 5,199,326 A | 4/1993 | Iwatsuki et al. |
| 5,336,120 A | 8/1994 | Maurer et al. |
| 5,754,969 A | 5/1998 | Ando et al. |
| 6,095,117 A | 8/2000 | Minowa et al. |
| 6,481,390 B1 | 11/2002 | Robb |
| 6,513,463 B2 | 2/2003 | Katayama |
| 6,520,147 B1 | 2/2003 | Kanno |
| 6,644,933 B2 | 11/2003 | Light et al. |
| 6,695,743 B2 | 2/2004 | Tanaka et al. |
| 6,709,302 B2 | 3/2004 | Yanagihara |
| 6,884,133 B2 | 4/2005 | Ishii |
| 6,899,575 B1 | 5/2005 | Rothe et al. |
| 7,121,233 B2 | 10/2006 | Kitamura et al. |
| 7,214,164 B2 | 5/2007 | Shomura et al. |
| 7,578,713 B2 | 8/2009 | Miyata et al. |
| 7,704,183 B2 | 4/2010 | Nakamura et al. |
| 7,744,435 B2 | 6/2010 | Ide et al. |
| 2002/0173895 A1 | 11/2002 | Kitaori et al. |
| 2005/0230207 A1 | 10/2005 | Tsunekawa |
| 2007/0293103 A1 | 12/2007 | Kinoshita et al. |

FOREIGN PATENT DOCUMENTS

| EP | 1 860 347 A2 | 11/2007 |
| JP | 63-038096 A | 2/1988 |
| JP | 02-120564 A | 5/1990 |
| JP | 0 430 675 A2 | 6/1991 |
| JP | 04-366067 A | 12/1992 |
| JP | 05-039088 A | 2/1993 |
| JP | 08-170724 A | 7/1996 |
| JP | 2007-315498 A | 12/2007 |

*Primary Examiner* — Justin Holmes
*Assistant Examiner* — David J Hlavka
(74) *Attorney, Agent, or Firm* — Carrier Blackman & Associates, P.C.; Joseph P. Carrier; William D. Blackman (57) ABSTRACT

In an apparatus for controlling an outboard motor having an internal combustion engine to power a propeller and a torque converter interposed between the engine and a drive shaft and equipped with a lockup clutch, it is configured to, based on input rotation speed and output rotation speed of the torque converter, calculate a speed ratio of the torque converter and a change amount of the input rotation speed, and make the lockup clutch ON/OFF based on the calculated speed ratio and change amount. With this, it becomes possible to appropriately make the lockup clutch ON/OFF, thereby improving speed performance.

34 Claims, 8 Drawing Sheets

OUTBOARD MOTOR CONTROL APPARATUS

BACKGROUND OF THE INVENTION

1. Field of the Invention

This invention relates to an outboard motor control apparatus, particularly to an apparatus for controlling an outboard motor having a torque converter.

2. Description of the Related Art

In recent years, there is proposed an outboard motor having a torque converter interposed between an internal combustion engine and drive shaft to amplify output torque of the engine and then transmit it to the drive shaft for enhancing acceleration performance, etc., as taught, for example, by Japanese Laid-Open Patent Application No. 2007-315498 ('498). In this conventional technique, the torque converter includes a lockup clutch.

However, in the outboard motor having the torque converter as in the reference, although use of the torque converter improves acceleration performance, sufficient speed can not be acquired after completing acceleration (after amplification of the torque through the torque converter is completed) due to slippage of the torque converter, disadvantageously. This defect may be dealt with by promptly making the lockup clutch ON (i.e., engaged) after completing acceleration to prevent the torque converter slippage, but the reference does not disclose any technique concerning it.

SUMMARY OF THE INVENTION

An object of this invention is therefore to overcome the foregoing drawback by providing an apparatus for controlling an outboard motor having a torque converter, which apparatus appropriately makes the lockup clutch ON/OFF after completing acceleration, thereby improving speed performance.

In order to achieve the object, this invention provides an apparatus for controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising an input rotation speed detector that detects input rotation speed of the torque converter, an output rotation speed detector that detects output rotation speed of the torque converter; a speed ratio calculator that calculates a speed ratio of the torque converter based on the detected input rotation speed and the detected output rotation speed, an input rotation speed change amount calculator that calculates a change amount of the input rotation speed, and a clutch ON/OFF unit that makes the lockup clutch ON and OFF based on the calculated speed ratio and the calculated change amount of the input rotation speed.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

Preferred embodiments of an outboard motor control apparatus according to the invention will now be explained with reference to the attached drawings.

Figure 1:
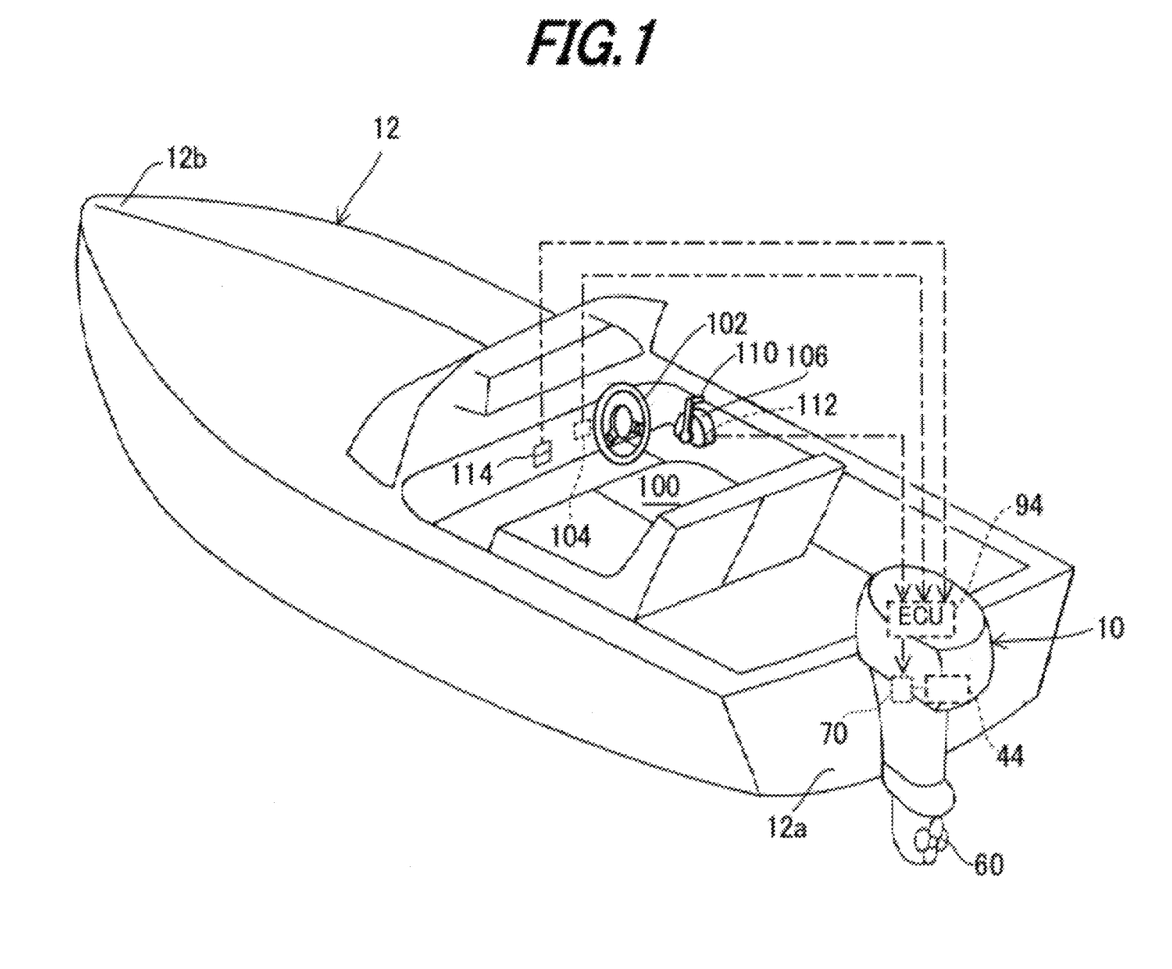
FIG. 1 is an overall schematic view of an outboard motor control apparatus including a boat (hull) according to a first embodiment of the invention.
Figure 2:
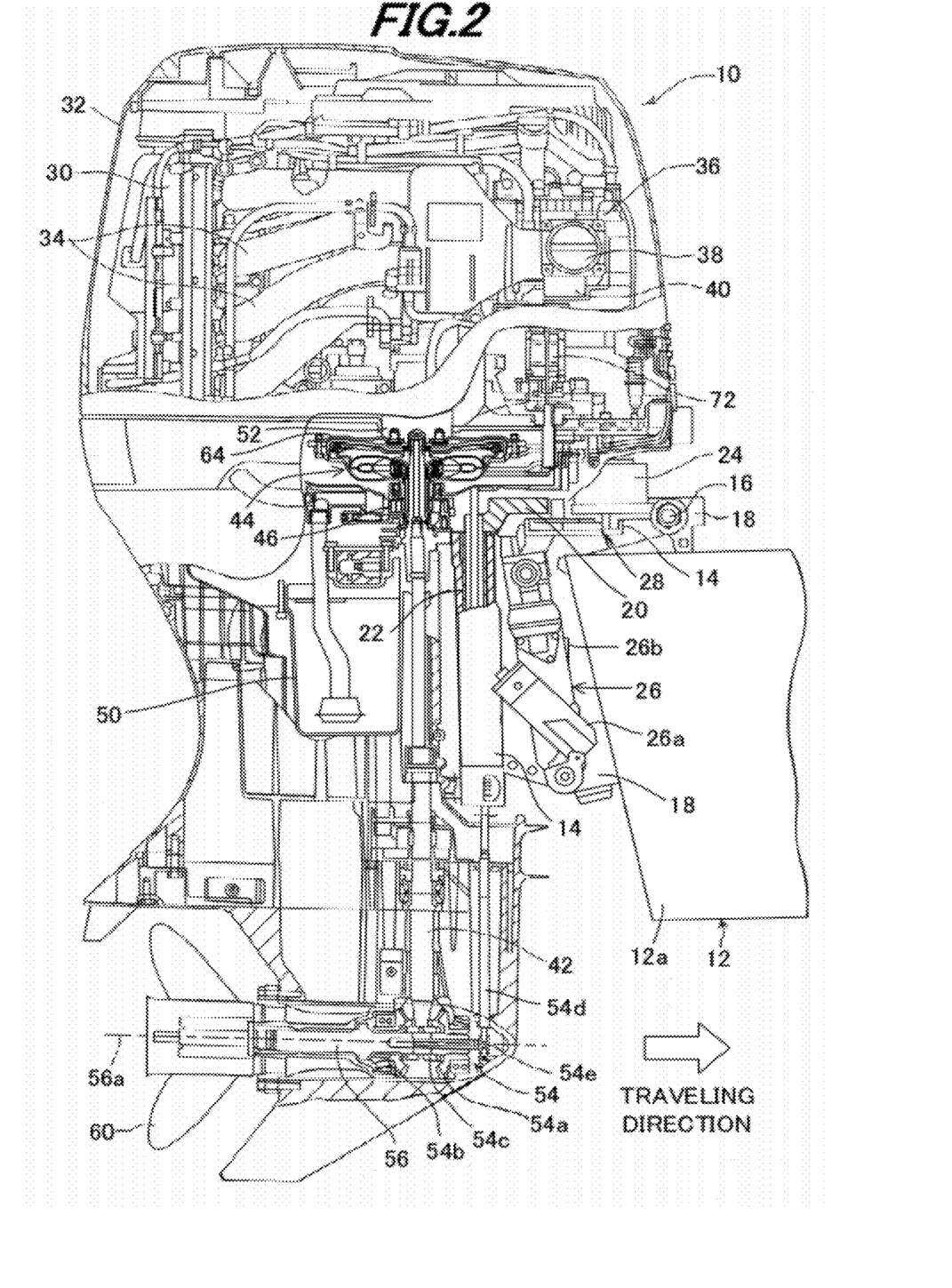
FIG. 2 is a sectional side view partially showing the outboard motor shown in FIG. 1.

FIG. 1 is an overall schematic view of an outboard motor control apparatus including a boat (hull) according to a first embodiment of the invention. FIG. 2 is a sectional side view partially showing the outboard motor shown in FIG. 1 and FIG. 3 is an enlarged side view of the outboard motor.

Figure 3:
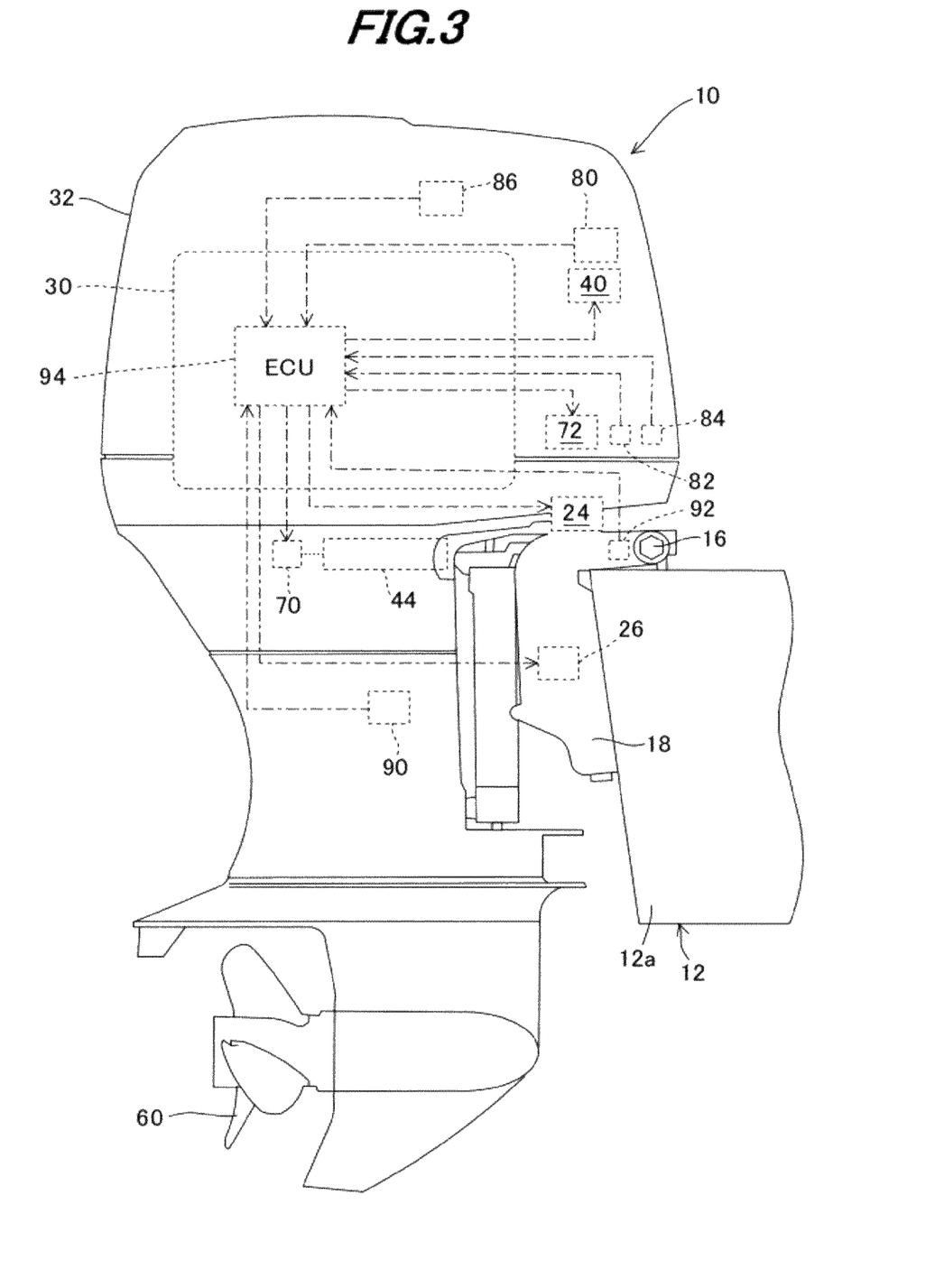
FIG. 3 is an enlarged side view of the outboard motor shown in FIG. 1.

In FIGS. 1 to 3, a symbol 10 indicates an outboard motor. As illustrated, the outboard motor 10 is clamped (fastened) to the stern or transom of a boat (hull) 12.

As shown in FIG. 2, the outboard motor 10 is fastened to the boat 12 through a swivel case 14, tilting shaft 16 and stern brackets 18. The outboard motor 10 is equipped with a mount frame 20 and shaft 22. The shaft 22 is housed in the swivel case 14 to be rotatable about the vertical axis such that the outboard motor 10 can be rotated about the vertical axis relative to the boat 12. The mount frame 20 is fixed at its upper end and lower end to a frame (not shown) constituting a main body of the outboard motor 10.

An electric steering motor (actuator) 24 for operating the shaft 22 and a power tilt-trim unit 26 for regulating a tilt angle and trim angle of the outboard motor 10 relative to the boat 12 are installed near the swivel case 14. The output shaft of the steering motor 24 is connected to the upper end of the mount frame 20 via a speed reduction gear mechanism 28. Specifically, a rotational output of the steering motor 24 is transmitted to the mount frame 20 via the speed reduction gear mechanism 28, whereby the outboard motor 10 is steered about the shaft 22 as a steering axis to the right and left directions (steered about the vertical axis).

The power tilt-trim unit 26 integrally comprises a hydraulic cylinder 26a for adjusting the tilt angle and a hydraulic cylinder 26b for adjusting the trim angle. When the hydraulic cylinders 26a, 26b are extended and contracted, the swivel case 14 is rotated about the tilting shaft 16 as a rotational axis, thereby tiling up/down and trimming up/down the outboard motor 10. The hydraulic cylinders 26a, 26b are connected to a hydraulic circuit (not shown) in the outboard motor 10 to be supplied with operating oil, and their extension/contraction is conducted upon receipt of the operating oil supply.

An internal combustion engine (hereinafter referred to as the "engine") 30 is disposed in the upper portion of the outboard motor 10. The engine 30 comprises a spark-ignition, water-cooling gasoline engine with a displacement of 2,200 cc. The engine 30 is located above the water surface and covered by an engine cover 32.

An intake pipe 34 of the engine 30 is connected to a throttle body 36. The throttle body 36 has a throttle valve 38 installed therein and an electric throttle motor (actuator) 40 for opening and closing the throttle valve 38 is integrally disposed thereto.

The output shaft of the throttle motor 40 is connected to the throttle valve 38 via a speed reduction gear mechanism (not shown) disposed near the throttle body 36. The throttle motor 40 is operated to open and close the throttle valve 38, thereby regulating the flow rate of the air sucked in the engine 30 to control the engine speed.

The outboard motor 10 further comprises a drive shaft (vertical shaft) 42 installed parallel with the vertical axis to be rotatably supported, a torque converter 44 interposed between the engine 30 and drive shaft 42, a hydraulic pump 46 that is attached to the drive shaft 42 and pumps operating oil to a lubricated portion of the engine 30, the power tilt-trim unit 26, the torque converter 44 and the like, and a reservoir 50 for reserving the operating oil.

The upper end of the drive shaft 42 is connected to a crankshaft 52 of the engine 30 through the torque converter 44 and the lower end thereof is connected via a shift mechanism 54 with a propeller shaft 56 supported to be rotatable about the horizontal axis. The propeller shaft 56 is located such that its axis line is substantially parallel with the traveling or cruising direction of the boat 12 in the initial condition of the power tilt-trim unit 26. One end of the propeller shaft 56 is attached with a propeller 60. Thus the drive shaft 42 connects the engine 30 with the propeller 60.

Figure 4:
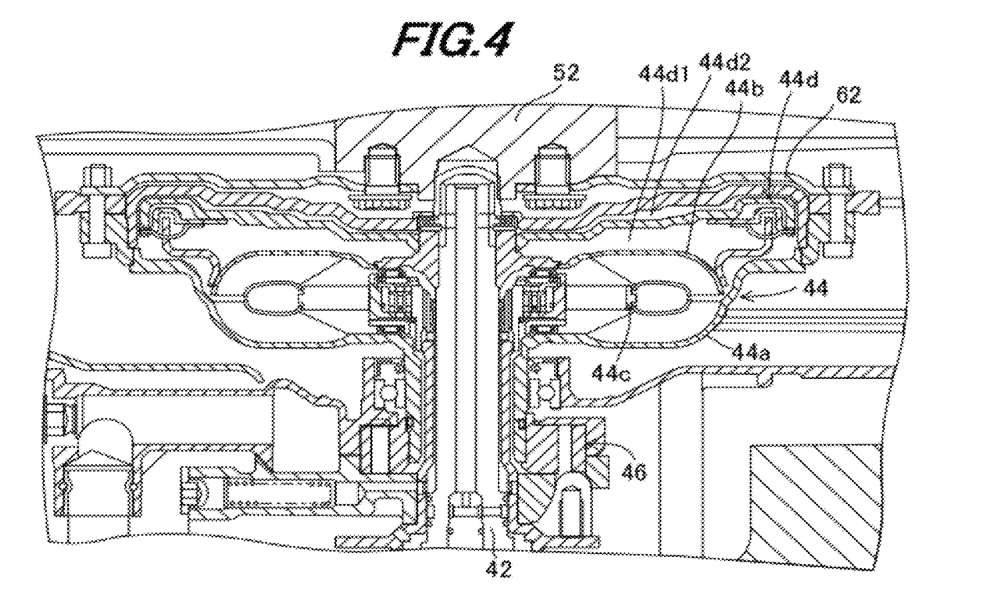
FIG. 4 is an enlarged sectional view showing a region around a torque converter shown in FIG. 2.

FIG. 4 is an enlarged sectional view showing a region around the torque converter 44 shown in FIG. 2.

As shown in FIG. 4, the torque converter 44 includes a pump impeller 44$a$ connected to the crankshaft 52 through a drive plate 62, a turbine runner 44$b$ that is installed to face the pump impeller 44$a$ to receive/discharge the operating oil and connected to the drive shaft 42, a stator 44$c$ installed between the pump impeller 44$a$ and turbine runner 44$b$, a lockup clutch 44$d$ and other components.

Figure 5:
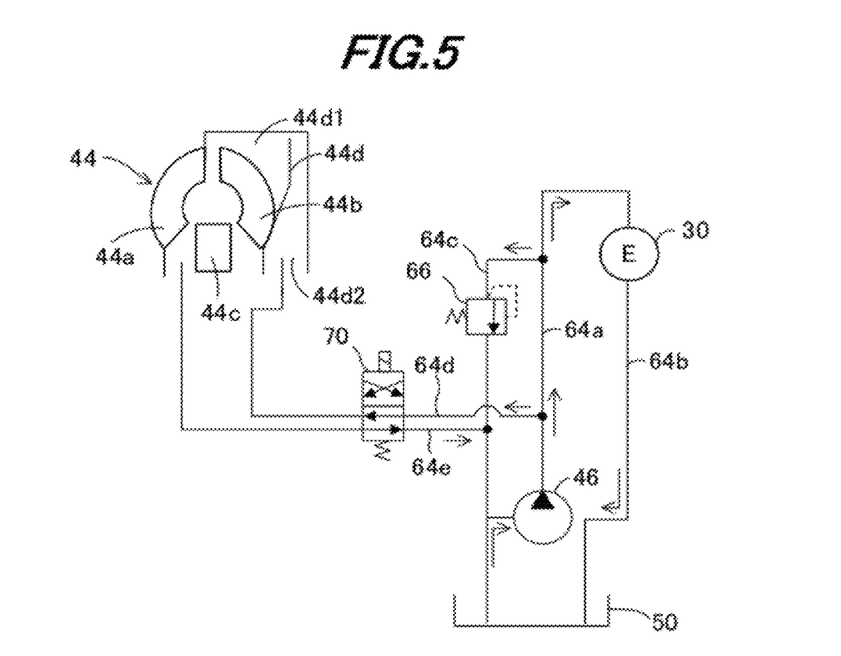
FIG. 5 is a hydraulic circuit diagram schematically showing the torque converter, a hydraulic pump and other components shown in FIG. 2.

FIG. 5 is a hydraulic circuit diagram schematically showing the torque converter 44, hydraulic pump 46, etc.

The hydraulic pump 46 driven by the engine 30 pumps up the operating oil in the reservoir 50 and forwards it to a first oil passage 64$a$. The pressurized operating oil forwarded to the first oil passage 64$a$ is supplied to the lubricated portion of the engine 30, power tilt-trim unit 26 (not shown in FIG. 5) or the like and then returns to the reservoir 50 through a second oil passage 64$b$.

The first oil passage 64$a$ is provided with a third oil passage 64$c$ connecting the first oil passage 64$a$ with an intake hole of the hydraulic pump 46. The third oil passage 64$c$ is interposed with a relief valve 66 that opens when the pressure of the operating oil supplied to the engine 30 is at or above a defined value and closes when it is below the defined value.

A fourth oil passage 64$d$ for circulating the operating oil supplied to the torque converter 44 is connected to the first oil passage 64$a$ at a point between a discharge hole of the hydraulic pump 46 and a branch point of the first and third oil passages 64$a$, 64$c$. A fifth oil passage 64$e$ for circulating the operating oil returning from the torque converter 44 to the hydraulic pump 46 is connected to the third oil passage 64$c$ at a location downstream of the relief valve 66. The fourth and fifth oil passages 64$d$, 64$e$ are installed with a lockup control valve 70 for controlling the operation of the lockup clutch 44$d$.

The lockup control valve 70 is a solenoid valve. The output of the valve 70 is connected to a piston chamber 44$d$1 of the lockup clutch 44$d$ of the torque converter 44, and also connected to a chamber (rear chamber) 44$d$2 disposed in the rear of the piston chamber 44$d$1. The lockup control valve 70 switches the oil passage upon being magnetized/demagnetized, thereby controlling the ON/OFF state (engagement/release) of the lockup clutch 44$d$.

Specifically, when the lockup control valve 70 is magnetized, the operating oil is supplied to the piston chamber 44$d$1 and discharged from the rear chamber 44$d$2 so as to make the lockup clutch 44$d$ ON (engaged), and when the valve 70 is demagnetized (the status in FIG. 5; initial condition), the operating oil is supplied to the rear chamber 44$d$2 and discharged from the piston chamber 44$d$1 so as to make the lockup clutch 44$d$ OFF (released). Since the details of the aforementioned torque converter 44 is disclosed in '498, further explanation is omitted here.

The explanation of FIG. 2 will be resumed. The shift mechanism 54 comprises a forward bevel gear 54$a$ and reverse bevel gear 54$b$ which are connected to the drive shaft 42 to be rotated, a clutch 54$c$ which can engage the propeller shaft 56 with either one of the forward bevel gear 54$a$ and reverse bevel gear 54$b$, and other components.

The interior of the engine cover 32 is disposed with an electric shift motor (actuator) 72 that drives the shift mechanism 54. The output shaft of the shift motor 72 can be connected via a speed reduction gear mechanism (not shown) with the upper end of a shift rod 54$d$ of the shift mechanism 54. Therefore, when the shift motor 72 is operated, its output appropriately displaces the shift rod 54$d$ and a shift slider 54$e$ to move the clutch 54$c$ to one shift position from among a forward position, reverse position and neutral position.

When the shift position is forward or reverse, the rotational output of the drive shaft 42 is transmitted via the shift mechanism 54 to the propeller shaft 56 to rotate the propeller 60 in one of the directions making the boat 12 move forward or rearward. The outboard motor 10 is equipped with a power source (not shown) such as a battery or the like attached to the engine 30 to supply operating power to the motors 24, 40, 72, etc.

As shown in FIG. 3, a throttle opening sensor 80 is installed near the throttle valve 38 and produces an output or signal indicative of opening of the throttle valve 38, i.e., throttle opening TH. A shift position sensor 82 installed near the shift rod 54$d$ produces an output or signal corresponding to a shift position (neutral, forward or reverse) and a neutral switch 84 also installed near the shift rod 54$d$ produces an ON signal when the shift position is neutral and an OFF signal when it is forward or reverse.

A crank angle sensor (input rotation speed detector) 86 is installed near the crankshaft 52 of the engine 30 and produces a pulse signal at every predetermined crank angle. A drive shaft rotation speed sensor (output rotation speed detector) 90 is installed near the drive shaft 42 and produces an output or signal indicative of rotation speed of the drive shaft 42.

A trim angle sensor (rotation angle sensor) 92 installed near the swivel case 18 produces an output or signal indicative of a trim angle θtrm of the outboard motor 10 (i.e., rotation angle of the outboard motor 10 about a pitch axis relative to the boat 12).

The outputs of the foregoing sensors and switch are sent to an Electronic Control Unit (ECU) 94 disposed in the outboard motor 10. The ECU 94 has a microcomputer including a CPU, ROM, RAM and other devices and installed in the engine cover 32 of the outboard motor 10.

As shown in FIG. 1, a steering wheel 102 is installed near a cockpit (the operator's seat) 100 of the boat 12 to be manipulated or rotated by the operator. A steering angle sensor 104 installed near a shaft (not shown) of the steering wheel 102 produces an output or signal corresponding to the steering angle of the steering wheel 102.

A remote control box 106 provided near the cockpit 100 is equipped with a shift/throttle lever 110 installed to be manipulated by the operator. Upon manipulation, the lever 110 can be swung in the front-back direction from the initial position and is used by the operator to input a shift position change command and engine speed regulation command. A lever position sensor 112 is installed in the remote control box 106 and produces an output or signal corresponding to a position of the lever 110.

A power tilt-trim switch 114 is further installed near the cockpit 100. The switch 114 can be manually manipulated by the operator to input commands for regulating the tilt angle and trim angle, and produces an output or signal corresponding to commands of tilt up/down or trim up/down. The outputs of the sensors 104, 112 and switch 114 are also sent to the ECU 94.

Based on the inputted outputs, the ECU 94 controls the operations of the motors and ON/OFF state of the lockup clutch 44d of the torque converter 44.

Figure 6:
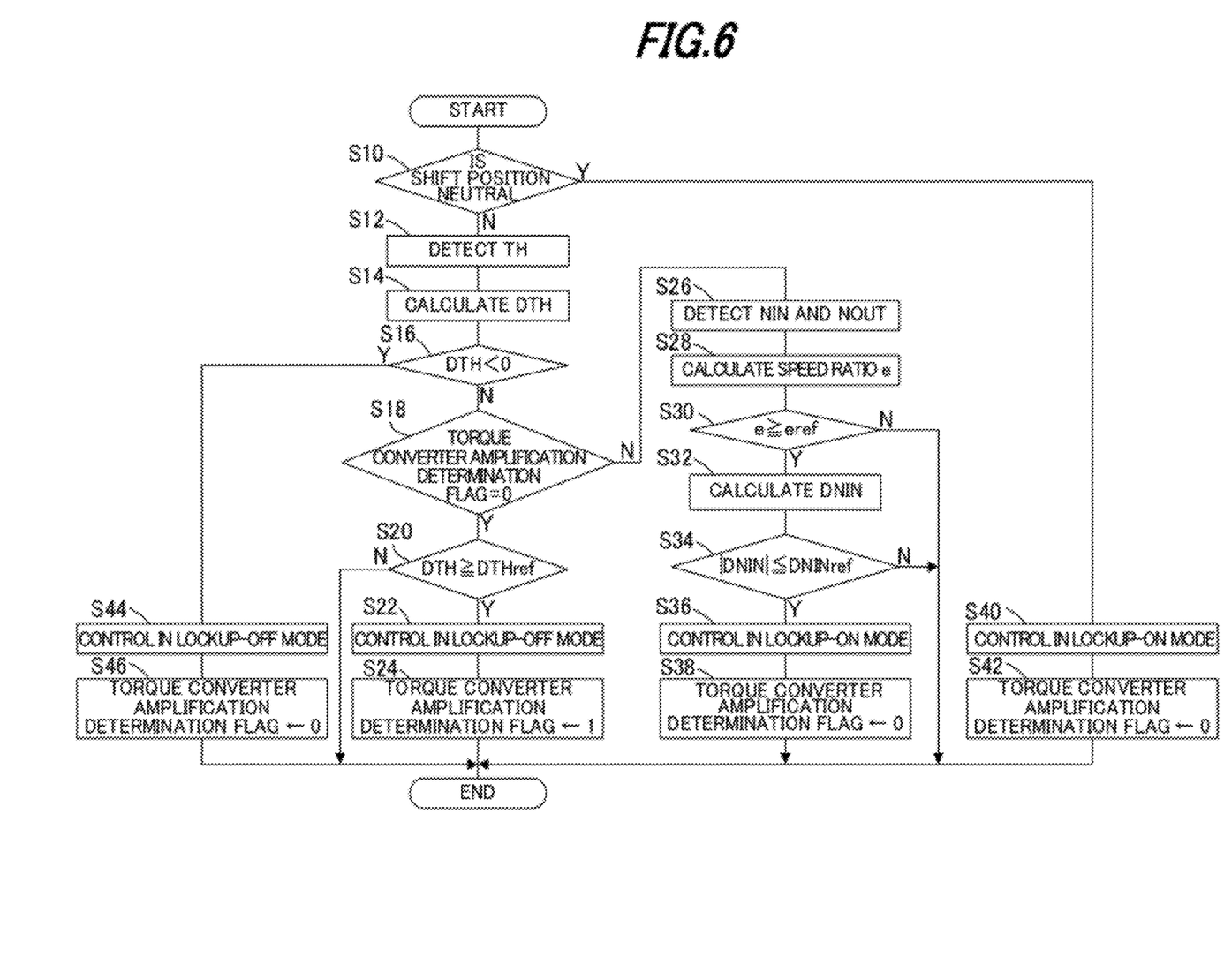
FIG. 6 is a flowchart showing the control of ON/OFF state of a lockup clutch of the torque converter, among the operations of an ECU in the apparatus shown in FIG. 1, etc.

FIG. 6 is a flowchart showing the control of ON/OFF state of the lockup clutch 44d. The illustrated program is executed by the ECU 94 at a predetermined interval, e.g., 100 milliseconds.

The program begins in S10, in which it is determined whether the shift position is neutral. This determination is made by checking as to whether the neutral switch 84 outputs the ON signal. When the result in S10 is negative, the program proceeds to S12, in which the throttle opening TH is detected or calculated from the output of the throttle opening sensor 80 and to S14, in which a change amount (variation) DTH of the detected throttle opening TH per a predetermined time (e.g., 500 milliseconds) is calculated.

The program proceeds to S16, in which it is determined whether the engine 30 is in a decelerating condition. The determination in S16 whether the engine 30 (precisely, the boat 12) is decelerating is made by checking as to whether the change amount DTH is less than 0 degree. In other words, when the change amount DTH is a negative value, the engine 30 is determined to be decelerating and when the change amount DTH is 0 or a positive value, it is determined to be at a constant speed or accelerating.

When the result in S16 is negative, the program proceeds to S18, in which it is determined whether a bit of an amplification determination flag of the torque converter 44 (torque converter amplification determination flag) is 0. As explained below, the bit of this flag is set to 1 when a condition where the output torque of the engine 30 is amplified through the torque converter 44 and transmitted to the drive shaft 42 (i.e., where the operation of the outboard motor 10 is in a range (torque amplification range) that the torque is to be amplified by the torque converter 44 to accelerate the boat 12) is established, and reset to 0 when the output torque of the engine 30 is not amplified (i.e., the operation of the outboard motor 10 is out of the torque amplification range).

Since the initial value of the bit of the torque converter amplification determination flag is 0, the result in S18 in the first program loop is generally affirmative and the program proceeds to S20, in which it is determined whether the engine 30 is in an accelerating condition. Specifically, the calculated change amount DTH is compared with a throttle predetermined value (threshold value) DTHref and, when the change amount DTH is equal to or greater than the predetermined value DTHref, the engine 30 is determined to be in the accelerating condition. The predetermined value DTHref is set to a value (e.g., 0.5 degree) enabling to determine whether the engine 30 is accelerating.

When the result in S20 is negative, i.e., the engine 30 is neither decelerating nor accelerating but the boat 12 cruises at a constant speed, the remaining steps are skipped and when the result is affirmative, the program proceeds to S22, in which the torque converter 44 is controlled in a lockup-OFF mode. The lockup-OFF mode demagnetizes the lockup control valve 70 to make the lockup clutch 44d OFF. Owing to this configuration, the output torque of the engine 30 is amplified by the torque converter 44 and transmitted to the drive shaft 42, thereby improving acceleration performance.

The program proceeds to S24, in which a bit of the torque converter amplification determination flag is set to 1 and the present program loop is terminated. Since the bit of this flag is set to 1, the result in S18 in the next and subsequent loops is negative and the program proceeds to S26.

Thus, when the bit of the torque converter amplification determination flag is set to 1, i.e., a condition where the output torque of the engine 30 is amplified by the torque converter 44 to accelerate the boat 12 is established, in other words, only when the engine 30 is in the accelerating condition, the result in S18 is negative and the process of S26 onward is conducted.

In S26, an input rotation speed NIN and output rotation speed NOUT of the torque converter 44 are detected or calculated. Since the input rotation speed NIN is identical with the engine speed because the input side of the torque converter 44 is connected to the crankshaft 52 of the engine 30, it is detected by counting the output pulses of the crank angle sensor 86. The output rotation speed NOUT is detected from the output of the drive shaft rotation speed sensor 90.

The program proceeds to S28, in which a speed ratio e of the torque converter 44 is calculated based on the input rotation speed NIN and output rotation speed NOUT. The speed ratio e is a value obtained by dividing the output rotation speed NOUT by the input rotation speed NIN as shown in the following equation.

$$\text{Speed ratio } e = (\text{Output rotation speed } NOUT)/(\text{Input rotation speed } NIN)$$

The program proceeds to S30, in which it is determined whether the torque amplification range is ended, i.e., whether the torque amplification range (acceleration range) is saturated and the acceleration is completed. Specifically, the calculated speed ratio e is compared with a reference value (threshold value) eref to determine whether the speed ratio e is equal to or greater than the reference value eref, and when the result is affirmative, it is determined that the torque amplification range is ended. The reference value eref is set to a value (e.g., 0.8) enabling to determine whether the torque amplification range is ended.

When the result in S30 is affirmative, the program proceeds to S32, in which a change amount DNIN of the input rotation speed NIN (i.e., a change amount (variation) of the engine speed) is calculated. The change amount DNIN is obtained by subtracting the input rotation speed NIN detected in the present program loop from that detected in the previous program loop.

The program proceeds to S34, in which it is determined whether the speed of the boat 12 remains stable at the maximum speed or thereabout after completing acceleration. This determination is made by comparing an absolute value of the calculated change amount DNIN with a prescribed value (threshold value) DNINref to determine whether the absolute value is equal to or less than the prescribed value DNINref, and when the result is affirmative, determining that the speed of the boat 12 is stable at the maximum value or thereabout. The prescribed value DNINref is set to a value (e.g., 500 rpm) enabling to determine whether the speed of the boat 12 remains stable at the maximum value or thereabout after completing acceleration, specifically, the change amount DNIN is relatively small.

When the result in S34 is affirmative, the program proceeds to S36, in which the torque converter 44 is controlled in a lockup-ON mode. The lockup-ON mode magnetizes the lockup control valve 70 to make the lockup clutch 44d ON. As a result, since the crankshaft 52 of the engine 30 and the drive shaft 42 are directly connected, slippage or the like of the torque converter 44 can be prevented and the speed of the boat 12 can reach the maximum speed (in a range of the engine performance), thereby improving speed performance.

Thus, the lockup clutch 44d is made ON/OFF based on the speed ratio e of the torque converter 44 and the change amount DNIN of the input rotation speed NIN.

After the process of S36, the program proceeds to S38, in which the bit of the torque converter amplification determination flag is reset to 0.

When the result in S30 or S34 is negative, since it means that the torque amplification range is not ended or saturated, or the speed of the boat 12 does not become stable at the maximum speed or thereabout, the process of S36, S38, etc., is skipped and the program is terminated.

When the result in S10 is affirmative, i.e., the shift position is neutral, the program proceeds to S40, in which the torque converter 44 is controlled in the lockup-ON mode, i.e., the lockup clutch 44d is made ON, and to S42, in which the bit of the torque converter amplification determination flag is reset to 0.

When the result in S16 is affirmative, i.e., the engine 30 is in the decelerating condition, the program proceeds to S44, in which the torque converter 44 is controlled in the lockup-OFF mode, i.e., the lockup clutch 44d is made OFF, and to S46, in which the bit of the torque converter amplification determination flag is reset to 0 and the program is terminated.

As stated above, the first embodiment is configured to calculate the speed ratio e of the torque converter 44 and the change amount DNIN of the input rotation speed NIN based on the input rotation speed NIN and output rotation speed NOUT of the torque converter 44 and make the lockup clutch 44 ON/OFF based on the calculated speed ratio e and change amount DNIN. With this, it becomes possible to appropriately make the lockup clutch 44d ON/OFF, thereby improving speed performance.

More specifically, it is configured to detect that the torque amplification range is ended and the boat 12 cruises at the maximum speed or thereabout based on the speed ratio e and change amount DNIN, and make the lockup clutch 44d ON/OFF based thereon. In other words, when the speed of the boat 12 has reached the maximum speed or thereabout after completing acceleration, the lockup clutch 44d can be promptly made ON (engaged). As a result, the boat speed can reach the maximum speed while preventing slippage or the like of the torque converter 44, thereby improving speed performance and fuel efficiency.

Further, since the lockup clutch 44d is made ON when the speed ratio e is equal to or greater than the reference value eref and the change amount DNIN is equal to or less than the prescribed value DNINref, it becomes possible to accurately detect that the acceleration is completed and the lockup clutch 44d can be made ON under the detected condition, thereby further improving speed performance.

Further, since the reference value eref is set to a value enabling to determine whether the torque amplification range is ended, it becomes possible to accurately detect that the torque amplification range is saturated and the acceleration is completed, and the lockup clutch 44d can be made ON under the detected condition, thereby further improving speed performance.

Further, since the prescribed value DNINref is a value enabling to determine whether the speed of the boat 12 remains stable at the maximum value or thereabout, the lockup clutch 44d can be made ON when the boat cruises at the maximum speed or thereabout after completing acceleration. As a result, the boat speed can reach the maximum speed while preventing slippage of the torque converter 44, thereby further improving speed performance and fuel efficiency.

Further, since it is configured to make the lockup clutch 44d OFF when the engine 30 is in the decelerating condition, it becomes possible to make the lockup clutch 44d OFF appropriately when the engine 30 is in the decelerating condition in which direct connection of the engine 30 with the drive shaft 42 is not needed.

Further, since it is configured to calculate the change amount DTH of the throttle opening TH and determine that the engine 30 is in the decelerating condition when the change amount DTH is a negative value, it becomes possible to accurately detect that the engine 30 is in the decelerating condition.

Figure 7:
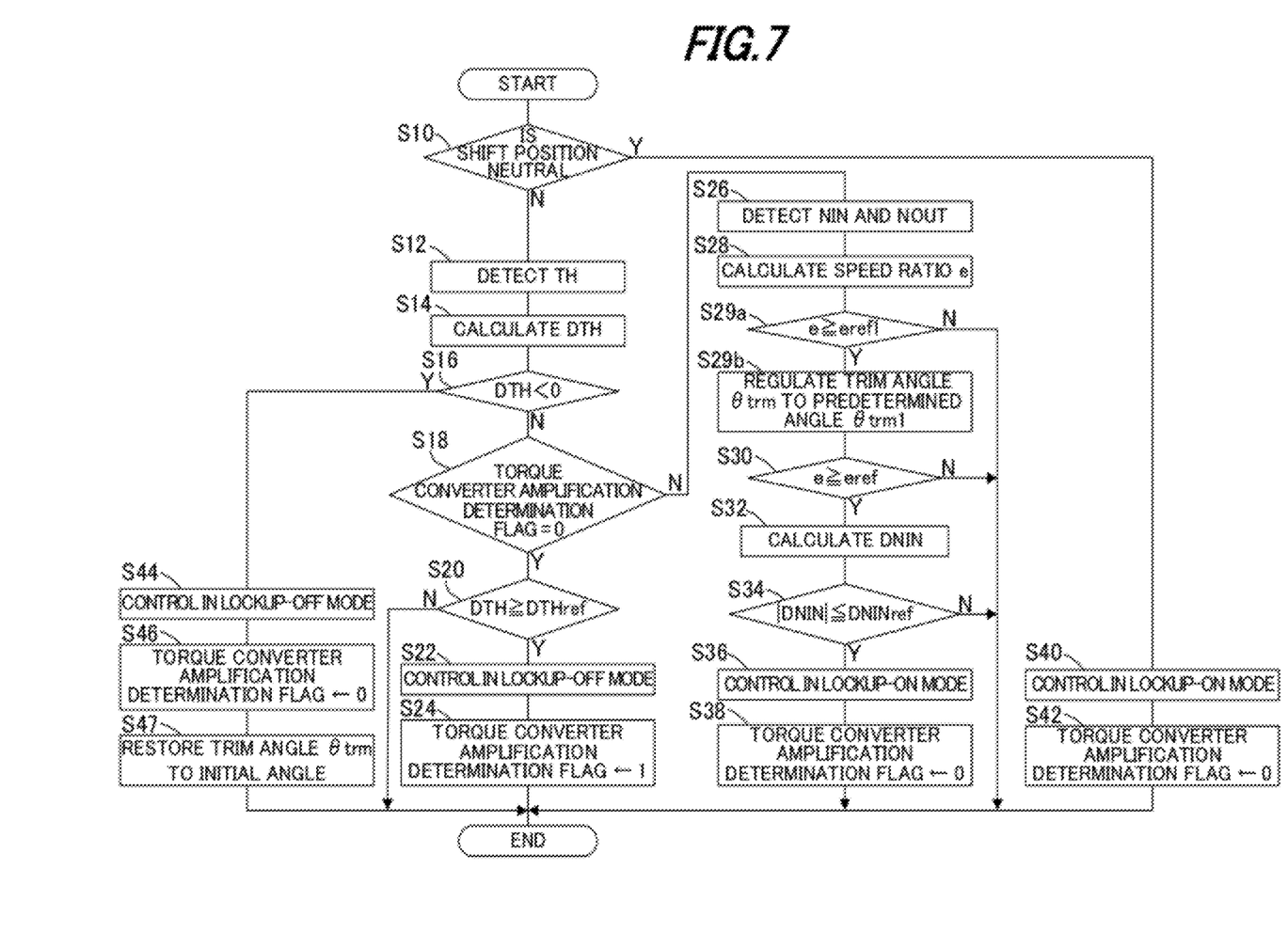
FIG. 7 is a flowchart similar to FIG. 6, but showing the control of ON/OFF state of the lockup clutch of the torque converter and the operation of trim angle regulation, among the operations of the ECU in an outboard motor control apparatus according to a second embodiment of the invention.

FIG. 7 is a flowchart similar to FIG. 6, but showing the control of ON/OFF state of the lockup clutch 44d of the torque converter 44 and the operation of trim angle regulation, among the operations of the ECU 94 in an outboard motor control apparatus according to a second embodiment of the invention. In the FIG. 7 flowchart, the same steps as those in the FIG. 6 flowchart explained in the first embodiment are applied with the same step numbers and the explanation thereof will be omitted.

The explanation of the second embodiment will focus on the points of difference from the first embodiment. After the process of S10 to S28, the program proceeds to S29a, in which it is determined whether it is immediately before the torque amplification range is ended, precisely, immediately before the torque amplification range (acceleration range) is saturated and the acceleration is completed. Specifically, the calculated speed ratio e is compared with a trim angle regulation reference value (threshold value) eref1, and when the speed ratio e is equal to or greater than the reference value eref1, it is determined to be immediately before the torque amplification range is ended. The reference value eref1 is set to a value (e.g., 0.7) enabling to determine whether it is immediately before the torque amplification range is ended.

In S29a, it is also determined whether the power tilt-trim switch 114 is manipulated by the operator to input a command for regulating the trim angle, etc. When the signal corresponding to the command is inputted, the power tilt-trim unit 26 is operated in accordance with the signal even if the speed ratio e is below the reference value eref1. Therefore, the operator can operate the power tilt-trim unit 26 by manipulating the switch 114, thereby regulating the trim angle θtrm at any time.

When the result in S29a is negative, the remaining steps are skipped and when the result is affirmative, the program proceeds to S29b, in which the power tilt-trim unit 26 is operated so that the trim angle θtrm detected from the output of the trim angle sensor 92 is regulated to a predetermined angle θtrm1.

FIG. 8 is a set of explanatory views for explaining the process. In the drawing, a symbol y indicates the front-back direction of the outboard motor 10, a symbol z the vertical direction thereof, a symbol W seawater or freshwater, and a symbol S the water surface. The longitudinal direction and vertical direction represent those with respect to the outboard motor 10 and they may differ from the gravitational direction and horizontal direction depending on the tilt angle or trim angle of the outboard motor 10.

Figure 8A:
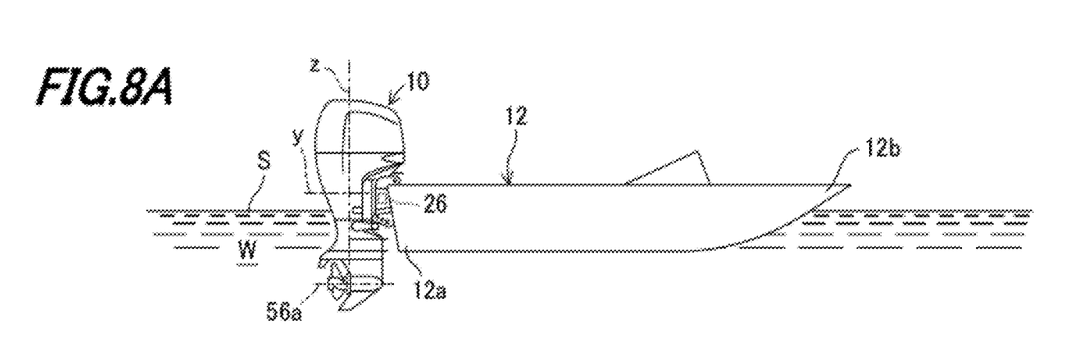
FIG. 8 is a set of explanatory views for explaining the process of FIG. 7 flowchart.
Figure 8B:
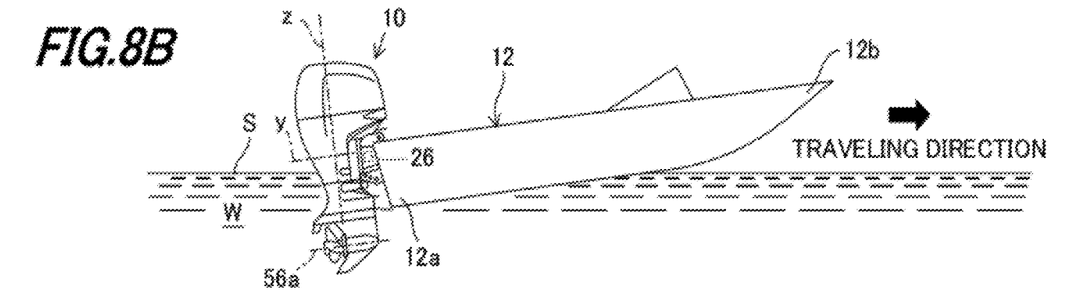

FIG. 8A shows the boat 12 in the stop condition or traveling at relatively low speed. In this condition, when the engine 30 is accelerated and the speed of the boat 12 is increased, as shown in FIG. 8B, a bow 12b of the boat 12 is lifted up and the stern 12a thereof is sunk down (the boat speed lies the so-called "hump" region). As can be seen from the drawing, the axis line 56a of the propeller shaft 56 is not parallel with the traveling direction of the boat 12.

Figure 8C:
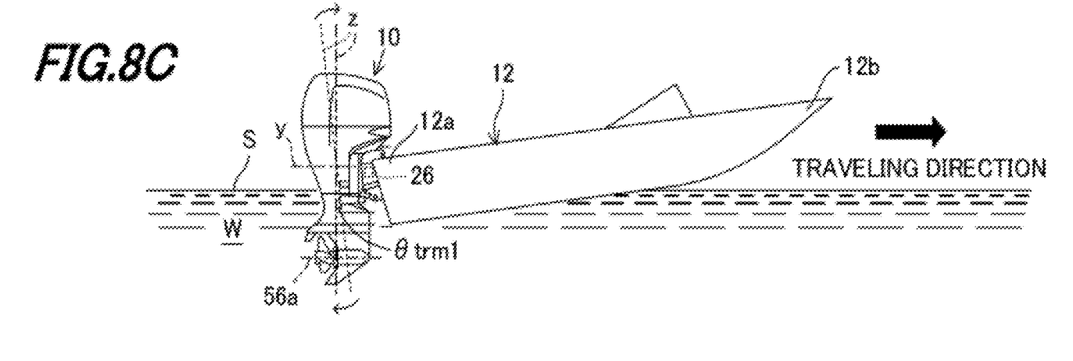

When the accelerating condition of the engine 30 is continued so that the speed ratio e of the torque converter 44 becomes equal to or greater than the reference value eref1, i.e., when it becomes immediately before the torque amplification range is ended, as shown in FIG. 8C, the power tilt-trim unit 26 is operated to regulate the trim angle θtrm to the predetermined angle θtrm1, thereby trimming up the outboard motor 10 (S29b). Since the trim angle θtrm is thus regulated, the axis line 56a of the propeller shaft 56 (i.e., the direction of thrust of the outboard motor 10) can be positioned substantially parallel with the traveling direction of the boat 12, resulting in the decrease of resistance against the boat 12 from the water surface S.

With this, the speed of the boat 12 is increased immediately before the torque amplification range is ended. The predetermined angle θtrm1 is set to a value (e.g., 5 degrees) enabling to position the axis line 56a substantially parallel with the traveling direction of the boat 12 to decrease resistance against the boat 12 from the water surface S.

The explanation of FIG. 7 will be resumed. The program proceeds to S32, in which, similarly to the first embodiment, it is determined whether the torque amplification range is ended. Specifically, the speed ratio e is compared with the reference value eref (e.g., 0.8) defined greater than the reference value eref1, and when the speed ratio e is equal to or greater than the reference value eref, it is determined that the torque amplification range is ended. The process of S34 to 42 is the same as that in the first embodiment.

When the result in S16 is affirmative, following to the process of S44 and S46, the program proceeds to S47, in which the power tilt-trim unit 26 is restored to the initial condition. Specifically, in the case where the trim angle θtrm is regulated to the predetermined angle θtrm1 in S29b, the power tilt-trim unit 26 is operated to regulate the trim angle θtrm to an initial angle (e.g., 0 degree) and the program is terminated.

As stated above, the second embodiment is configured to, based on the speed ratio e, operate the power tilt-trim unit 26 to regulate the trim angle θtrm to the predetermined angle θtrm1 before making the lockup clutch 44d ON. With this, it becomes possible to trim up by using the predetermined angle θtrm1 that enables to decrease resistance against the boat 12 from the water surface S, and hence, the boat speed can be increased before the lockup clutch 44d is made ON. Since the boat speed is accelerated due to the operation of the power tilt-trim unit 26 even when the lockup clutch 44d is made ON after completing acceleration and the torque to be transmitted to the drive shaft 42 is decreasing, it becomes possible to prevent the operator from experiencing decelerating feel.

Further, since the predetermined angle θtrm1 is a value enabling to position the axis line 56a of the propeller shaft 56 substantially parallel with the traveling direction of the boat 12, it becomes possible to efficiently decrease resistance against the boat 12 from the water surface S, thereby reliably increasing the speed of the boat 12 before the lockup clutch 44d is made ON.

Further, since the trim angle regulation reference value eref1 is a value enabling to determine whether it is immediately before the torque amplification range is ended, it becomes possible to reliably increase the speed of the boat 12 before the torque amplification range is saturated and the acceleration is completed, i.e., the lockup clutch 44d is made ON.

Further, since the lockup clutch 44d is made ON when the speed ratio e is equal to or greater than the reference value eref defined greater than the reference value eref1 and the change amount DNIN is equal to or less than the prescribed value DNINref, it becomes possible to accurately detect that the torque amplification by the torque converter 44 is ended and the acceleration is completed, and the lockup clutch 44d can be made ON under the detected condition, thereby improving speed performance.

Further, the power tilt-trim unit 26 is operated to regulate the trim angle θtrm to the predetermined angle θtrm1 when the engine 30 is determined to be in the accelerating condition. Since the above regulation is implemented only when the engine 30 is in the accelerating condition, it becomes possible to efficiently mitigate decelerating feel generated when the lockup clutch 44d is made ON after completing acceleration.

Further, since the engine 30 is determined to be in the accelerating condition when the change amount DTH is equal to or greater than the throttle predetermined value DTHref, it becomes possible to accurately detect that the engine 30 is in the accelerating condition.

Further, since the power tilt-trim switch 114 is installed to be manually manipulated by the operator and the power tilt-trim unit 26 is operated upon manipulation of the switch 114, the operator can operate the power tilt-trim unit 26 by manipulating the switch 114, thereby regulating the trim angle θtrm at any time.

The remaining constituent elements and configuration are the same as that in the first embodiment.

Figure 9:
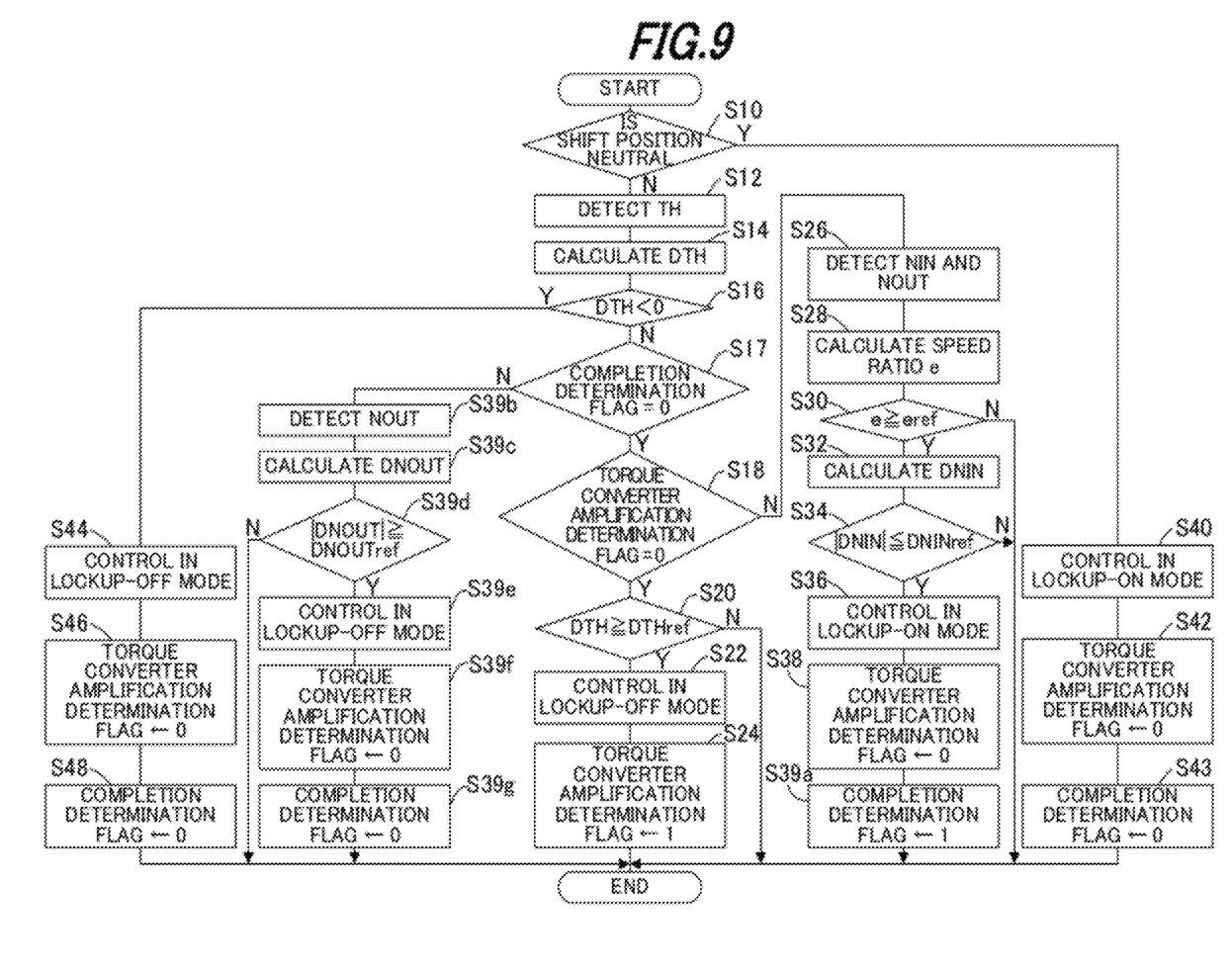
FIG. 9 is a flowchart similar to FIG. 6, but showing the control of ON/OFF state of the lockup clutch of the torque converter, among the operations of the ECU in an outboard motor control apparatus according to a third embodiment of the invention.

FIG. 9 is a flowchart similar to FIG. 6, but showing the control of ON/OFF state of the lockup clutch 44d of the torque converter 44, among the operations of the ECU 94 in an outboard motor control apparatus according to a third embodiment of the invention.

The explanation of the third embodiment will focus on the points of difference from the first embodiment. After the process of S10 to S16, when the result in S16 is negative, the program proceeds to S17, in which it is determined whether a bit of a determination flag of completion of acceleration by the torque converter 44 (completion determination flag) is 0.

Since the initial value of the bit of this flag is 0, the result in S17 in the first program loop is generally affirmative and the program proceeds to S18. Then the same process of S18 to S38 as in the first embodiment is conducted. Following to the process of S38, the program proceeds to S39a, in which the bit of the completion determination flag is set to 1.

The completion determination flag is set to 1 when the acceleration through torque amplification by the torque converter 44 is completed and the lockup clutch 44d is made ON, and otherwise, reset to 0.

The bit of this flag being set to 1 in S39a leads to the negative result in S17 in the next and subsequent loops, and the program proceeds to S39b onward.

In S39b, an output rotation speed NOUT of the torque converter 44 is detected or calculated and in S39c, a change amount DNOUT of the detected output rotation speed NOUT is calculated. Thus, when the lockup clutch 44d is made ON, the change amount DNOUT is calculated. The change amount DNOUT is obtained by subtracting the output rotation speed NOUT detected in the present program loop from that detected in the previous program loop.

The program proceeds to S39d, in which it is determined whether a load is abruptly changed because, for instance, an obstacle (such as an object floating on the water surface) contacted the propeller 60. When the load is abruptly changed due to contact with an obstacle, the output rotation speed NOUT which is the rotation speed of the drive shaft 42 is also greatly changed accordingly.

Therefore, in S39d, an absolute value of the change amount DNOUT is compared with a second prescribed value (threshold value) DNOUTref and when the absolute value is equal to or greater than the second prescribed value DNOUTref, it is determined that the abrupt load change has occurred. The second prescribed value DNOUTref is set to a value (e.g., 1000 rpm) enabling to determine whether the abrupt load change has occurred, i.e., the change amount DNOUT is relatively large.

When the result in S39d is negative, the remaining process is skipped and when the result is affirmative, the program proceeds to S39e, in which the torque converter 44 is controlled in the lockup-OFF mode, i.e., the lockup clutch 44d is made OFF. As a result, power transmission between the engine 30 and drive shaft 42 is cut off, thereby preventing the increased load from being directly transmitted to the engine 30.

After the process of S39e, the program proceeds to S39f, in which the bit of the torque converter amplification determination flag is reset to 0 and to S39g, in which the bit of the completion determination flag is reset to 0 and the program is terminated.

When the result in S10 is affirmative, following to the process of S40 and S42, the program proceeds to S43, in which the bit of the completion determination flag is reset to 0. When the result in S16 is affirmative, following to the process of S44 and S46, the program proceeds to S48, in which the bit of the completion determination flag is reset to 0 and the program is terminated.

As stated above, the third embodiment is configured to calculate the change amount DNOUT of the output rotation speed NOUT of the torque converter 44 when the lockup clutch 44d is made ON, and make the lockup clutch OFF (upon determining that the abrupt load change has occurred) to cut off power transmission between the engine 30 and drive shaft 42 by the torque converter 44 when the calculated change amount DNOUT is equal to or greater than the second prescribed value DNOUTref. With this, it becomes possible to prevent the increased load from being directly transmitted to the engine 30, thereby avoiding a trouble such as engine component failure.

Further, since the second prescribed value DNOUTref is a value enabling to determine whether the abrupt load change has occurred due to contact of the propeller 60 with an obstacle, it becomes possible to accurately detect increase of the load for such the reason and the lockup clutch 44d can be made OFF in response thereto, thereby surely avoiding a trouble such as engine component failure.

The remaining constituent elements and configuration are the same as those in the above embodiments.

As described in the foregoing, the first to third embodiments are configured to have an apparatus for (and a method of) controlling an outboard motor (10) mounted on a stern of a boat (12) and having an internal combustion engine (30) to power a propeller (60), a drive shaft (42) that connects the engine and the propeller, and a torque converter (44) that is interposed between the engine and the drive shaft and is equipped with a lockup clutch (44d), comprising an input rotation speed detector (crank angle sensor 86, ECU 94, S26) that detects input rotation speed NIN of the torque converter, an output rotation speed detector (drive shaft rotation speed sensor 90, ECU 94, S26) that detects output rotation speed NOUT of the torque converter, a speed ratio calculator (ECU 94, S28) that calculates a speed ratio e of the torque converter based on the detected input rotation speed NIN and the detected output rotation speed NOUT, an input rotation speed change amount calculator (ECU 94, S32) that calculates a change amount DNIN of the input rotation speed NIN, and a clutch ON/OFF unit (ECU 94, S30, S34, S36) that makes the lockup clutch ON and OFF based on the calculated speed ratio e and the calculated change amount DNIN of the input rotation speed NIN.

The apparatus further includes a first determiner (ECU 94, S30) that compares the speed ratio e with a reference value eref and determines whether the speed ratio e is equal to or greater than the reference value eref, and a second determiner (ECU 94, S34) that compares the change amount DNIN of the input rotation speed NIN with a prescribed value DNINref and determines whether the change amount DNIN is equal to or less than the prescribed value DNINref, and the clutch ON/OFF unit makes the lockup clutch ON when the speed ratio e is equal to or greater than the reference value eref and the change amount DNIN is equal to or less than the prescribed value DNINref (S36).

In the apparatus, the reference value eref is a value enabling to determine whether a torque amplification range is ended (S30).

In the apparatus, the prescribed value DNINref is a value enabling to determine whether speed of the boat remains stable at maximum value or thereabout (S34).

The apparatus further includes a decelerating condition determiner (ECU 94, S16) that determines whether the engine is in a decelerating condition, and the clutch ON/OFF unit makes the lockup clutch OFF when the engine is in the accelerating condition (S44).

The apparatus further includes a throttle opening change amount calculator (throttle opening sensor 80, ECU 94, S14) that calculates a change amount DTH of throttle opening TH of a throttle valve (38) of the engine, and the decelerating condition determiner determines that the engine is in the decelerating condition when the change amount DTH of the throttle opening TH is a negative value (S16).

The apparatus in the second embodiment further includes a trim angle regulator (power tilt-trim unit 26) that regulates a trim angle θtrm relative to the boat, and a trim angle regulator operator (ECU 94, S29a, S29b) that operates the trim angle regulator to regulate the trim angle θtrm to a predetermined angle θtrm1 when the speed ratio e is equal to or greater than a trim angle regulation reference value eref1, and the clutch ON/OFF unit makes the lockup clutch ON after the trim angle θtrm is regulated to the predetermined angle θtrm1 (S36).

In the apparatus, the predetermined angle θtrm1 is a value enabling to position an axis line (56a) of a propeller shaft (56) connected to the propeller substantially parallel with a traveling direction of the boat (S29b).

In the apparatus, the trim angle regulation reference value eref1 is a value enabling to determine whether it is immediately before a torque amplification range is ended (S29a).

In the apparatus, the clutch ON/OFF unit makes the lockup clutch ON when the speed ratio e is equal to or greater than a reference value eref defined greater than the trim angle regulation reference value eref1 and the change amount DNIN of the input rotation speed NIN is equal to or less than a prescribed value DNINref (S30, S34, S36).

In the apparatus, the reference value eref is a value enabling to determine whether a torque amplification range is ended (S30).

In the apparatus, the prescribed value DNINref is a value enabling to determine whether speed of the boat remains stable at maximum value or thereabout (S34).

The apparatus further includes an accelerating condition determiner (ECU 94, S20) that determines whether the engine is in the accelerating condition, and the trim angle regulator operator operates the trim angle regulator to regulate the trim angle θtrm to the predetermined angle θtrm1 when the engine is determined to be in the accelerating condition (S29b).

The apparatus further includes a throttle opening change amount calculator (throttle opening sensor 80, ECU 94, S14) that calculates a change amount DTH of throttle opening TH of a throttle valve of the engine, and the accelerating condition determiner determines that the engine is in the accelerating condition when the change amount DTH of the throttle opening TH is equal to or greater than a throttle predetermined value DTHref (S20).

The apparatus further includes a switch (power tilt-trim switch 114) installed to be manually manipulated by an operator, and the trim angle regulator operator operates the trim angle regulator upon manipulation of the switch (S29a).

The apparatus in the third embodiment further includes an output rotation speed change amount calculator (ECU 94, S39c) that calculates a change amount DNOUT of the output rotation speed NOUT when the lockup clutch is made ON, and the clutch ON/OFF unit makes the lockup clutch OFF when the change amount DNOUT of the output rotation speed NOUT is equal to or greater than a second prescribed value DNOUTref (S39d, S39e).

In the apparatus, the second prescribed value DNOUTref is a value enabling to determine whether abrupt load change has occurred due to contact of the propeller with an obstacle (S39d).

It should be noted that, although the reference value eref, trim angle regulation reference value eref1, prescribed value DNINref, second prescribed value DNOUTref, predetermined angle θtrm1, displacement of the engine 30 and other values are indicated with specific values in the foregoing, they are only examples and not limited thereto.

It should also be noted that, in the third embodiment, although the change amount DNOUT of the output rotation speed NOUT is used to determine occurrence of the load change, since this determination is made when the lockup clutch 44d is made ON and the input rotation speed NIN and output rotation speed NOUT are identical, the change amount DNIN of the input rotation speed NIN (i.e., a change amount of engine speed) can be used instead.

Japanese Patent Application Nos. 2008-270211, 2008-270212 and 2008-270215, all filed on Oct. 20, 2008 are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising:
    an input rotation speed detector that detects input rotation speed of the torque converter;
    an output rotation speed detector that detects output rotation speed of the torque converter;
    a speed ratio calculator that calculates a speed ratio of the torque converter based on the detected input rotation speed and the detected output rotation speed;
    an input rotation speed change amount calculator that calculates a change amount of the input rotation speed; and
    a clutch ON/OFF unit that makes the lockup clutch ON and OFF based on the calculated speed ratio and the calculated change amount of the input rotation speed.

2. The apparatus according to claim 1, further including:
    a first determiner that compares the speed ratio with a reference value and determines whether the speed ratio is equal to or greater than the reference value; and
    a second determiner that compares the change amount of the input rotation speed with a prescribed value and determines whether the change amount is equal to or less than the prescribed value,
    and the clutch ON/OFF unit makes the lockup clutch ON when the speed ratio is equal to or greater than the reference value and the change amount is equal to or less than the prescribed value.

3. The apparatus according to claim 2, wherein the reference value is a value enabling to determine whether a torque amplification range is ended.

4. The apparatus according to claim 2, wherein the prescribed value is a value enabling to determine whether speed of the boat remains stable at maximum value or thereabout.

5. The apparatus according to claim 1, further including:
    a decelerating condition determiner that determines whether the engine is in a decelerating condition,
    and the clutch ON/OFF unit makes the lockup clutch OFF when the engine is in the accelerating condition.

6. The apparatus according to claim 5, further including:
    a throttle opening change amount calculator that calculates a change amount of throttle opening of a throttle valve of the engine,
    and the decelerating condition determiner determines that the engine is in the decelerating condition when the change amount of the throttle opening is a negative value.

7. The apparatus according to claim 1, further including:
    a trim angle regulator that regulates a trim angle relative to the boat; and
    a trim angle regulator operator that operates the trim angle regulator to regulate the trim angle to a predetermined angle when the speed ratio is equal to or greater than a trim angle regulation reference value,
    and the clutch ON/OFF unit makes the lockup clutch ON after the trim angle is regulated to the predetermined angle.

8. The apparatus according to claim 7, wherein the predetermined angle is a value enabling to position an axis line of a propeller shaft connected to the propeller substantially parallel with a traveling direction of the boat.

9. The apparatus according to claim 7, wherein the trim angle regulation reference value is a value enabling to determine whether it is immediately before a torque amplification range is ended.

10. The apparatus according to claim 7, wherein the clutch ON/OFF unit makes the lockup clutch ON when the speed ratio is equal to or greater than a reference value defined greater than the trim angle regulation reference value and the change amount of the input rotation speed is equal to or less than a prescribed value.

11. The apparatus according to claim 10, wherein the reference value is a value enabling to determine whether a torque amplification range is ended.

12. The apparatus according to claim 10, wherein the prescribed value is a value enabling to determine whether speed of the boat remains stable at maximum value or thereabout.

13. The apparatus according to claim 7, further including:
an accelerating condition determiner that determines whether the engine is in the accelerating condition,
and the trim angle regulator operator operates the trim angle regulator to regulate the trim angle to the predetermined angle when the engine is determined to be in the accelerating condition.

14. The apparatus according to claim 13, further including:
a throttle opening change amount calculator that calculates a change amount of throttle opening of a throttle valve of the engine,
and the accelerating condition determiner determines that the engine is in the accelerating condition when the change amount of the throttle opening is equal to or greater than a throttle predetermined value.

15. The apparatus according to claim 7, further including:
a switch installed to be manually manipulated by an operator,
and the trim angle regulator operator operates the trim angle regulator upon manipulation of the switch.

16. The apparatus according to claim 1, further including:
an output rotation speed change amount calculator that calculates a change amount of the output rotation speed when the lockup clutch is made ON,
and the clutch ON/OFF unit makes the lockup clutch OFF when the change amount of the output rotation speed is equal to or greater than a second prescribed value.

17. The apparatus according to claim 16, wherein the second prescribed value is a value enabling to determine whether abrupt load change has occurred due to contact of the propeller with an obstacle.

18. A method of controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising steps of:
detecting input rotation speed of the torque converter;
detecting output rotation speed of the torque converter;
calculating a speed ratio of the torque converter based on the detected input rotation speed and the detected output rotation speed;
calculating a change amount of the input rotation speed; and
making the lockup clutch ON and OFF based on the calculated speed ratio and the calculated change amount of the input rotation speed.

19. The method according to claim 18, further including steps of:
comparing the speed ratio with a reference value to determine whether the speed ratio is equal to or greater than the reference value; and
comparing the change amount of the input rotation speed with a prescribed value to determine whether the change amount is equal to or less than the prescribed value,
and the step of making makes the lockup clutch ON when the speed ratio is equal to or greater than the reference value and the change amount is equal to or less than the prescribed value.

20. The method according to claim 19, wherein the reference value is a value enabling to determine whether a torque amplification range is ended.

21. The method according to claim 19, wherein the prescribed value is a value enabling to determine whether speed of the boat remains stable at maximum value or thereabout.

22. The method according to claim 18, further including a step of:
determining whether the engine is in a decelerating condition,
and the step of making makes the lockup clutch OFF when the engine is in the accelerating condition.

23. The method according to claim 22, further including a step of:
calculating a change amount of throttle opening of a throttle valve of the engine,
and the step of determining determines that the engine is in the decelerating condition when the change amount of the throttle opening is a negative value.

24. The method according to claim 18, including a trim angle regulator that regulates a trim angle relative to the boat, and further including a step of:
operating the trim angle regulator to regulate the trim angle to a predetermined angle when the speed ratio is equal to or greater than a trim angle regulation reference value,
and the step of making makes the lockup clutch ON after the trim angle is regulated to the predetermined angle.

25. The method according to claim 24, wherein the predetermined angle is a value enabling to position an axis line of a propeller shaft connected to the propeller substantially parallel with a traveling direction of the boat.

26. The method according to claim 24, wherein the trim angle regulation reference value is a value enabling to determine whether it is immediately before a torque amplification range is ended.

27. The method according to claim 24, wherein the step of making makes the lockup clutch ON when the speed ratio is equal to or greater than a reference value defined greater than the trim angle regulation reference value and the change amount of the input rotation speed is equal to or less than a prescribed value.

28. The method according to claim 27, wherein the reference value is a value enabling to determine whether a torque amplification range is ended.

29. The method according to claim 27, wherein the prescribed value is a value enabling to determine whether speed of the boat remains stable at maximum value or thereabout.

30. The method according to claim 24, further including a step of:
determining whether the engine is in the accelerating condition,
and the step of operating operates the trim angle regulator to regulate the trim angle to the predetermined angle when the engine is determined to be in the accelerating condition.

31. The method according to claim 30, further including a step of:

calculating a change amount of throttle opening of a throttle valve of the engine, and the step of determining determines that the engine is in the accelerating condition when the change amount of the throttle opening is equal to or greater than a throttle predetermined value.

32. The method according to claim 24, including a switch installed to be manually manipulated by an operator, and the step of operating operates the trim angle regulator upon manipulation of the switch.

33. The method according to claim 18, further including a step of:

calculating a change amount of the output rotation speed when the lockup clutch is made ON, and the step of making makes the lockup clutch OFF when the change amount of the output rotation speed is equal to or greater than a second prescribed value.

34. The method according to claim 33, wherein the second prescribed value is a value enabling to determine whether abrupt load change has occurred due to contact of the propeller with an obstacle.

* * * * *